United States Patent [19]

Teder

[11] Patent Number: 5,239,244
[45] Date of Patent: Aug. 24, 1993

[54] VEHICLE INTERFACE FOR MOISTURE-SENSITIVE WIPER CONTROL

[75] Inventor: Rein S. Teder, Minneapolis, Minn.

[73] Assignee: Libbey-Owens-Ford Co., Toledo, Ohio

[21] Appl. No.: 845,395

[22] Filed: Mar. 3, 1992

[51] Int. Cl.$^5$ ............................................. B60S 1/08
[52] U.S. Cl. ............................... 318/444; 318/DIG. 2; 318/483
[58] Field of Search ............... 318/443, 444, DIG. 2, 318/483; 15/250.12, 250.13, 250.16, 250.17; 307/9.1, 10.1

[56] References Cited

U.S. PATENT DOCUMENTS

| | | |
|---|---|---|
| 4,317,073 | 2/1982 | Blaszkowski . |
| 4,355,271 | 10/1982 | Noack . |
| 4,495,452 | 1/1985 | Boegh-Peterson . |
| 4,499,410 | 2/1985 | Iacoponi et al. . |
| 4,554,493 | 11/1985 | Armstrong . |
| 4,584,508 | 4/1986 | Kobayashi et al. . |
| 4,620,141 | 10/1986 | McCumber et al. . |
| 4,689,536 | 8/1987 | Iyoda . |
| 4,705,998 | 11/1987 | Millerd et al. . |
| 4,740,735 | 4/1988 | Hayashi . |
| 4,797,605 | 1/1989 | Palanisamy . |
| 4,798,956 | 1/1989 | Hochstein . |
| 4,805,070 | 2/1989 | Koontz et al. . |
| 4,857,815 | 8/1989 | Erdelitsch et al. . |
| 4,859,867 | 8/1989 | Larson et al. . |
| 4,859,919 | 8/1989 | Tracht . |
| 4,867,561 | 9/1989 | Fujii et al. . |
| 4,893,506 | 1/1990 | Shyu et al. . |
| 5,023,467 | 6/1991 | Uhl .................................. 307/10.1 |
| 5,059,877 | 10/1991 | Teder . |

Primary Examiner—Bentsu Ro
Attorney, Agent, or Firm—Haugen and Nikolai

[57] ABSTRACT

A combination manual and automatic vehicle windshield wiper control system is provided which integrates a windshield moisture-sensing based wiper control system into an existing design of original equipment wiper system with minimum impact on manufacture and retrofit by using the existing vehicle wiring harness and existing connectors. The invention provides easy integration of a moisture-sensitive wiper control system into a class of vehicles in a manner which does not interfere with the operation of the standard or pulse-wipe systems already existing in the manual mode even if the moisture-sensitive system should fail for any reason. The moisture-sensing mode of operation replaces the delay or pulse mode.

19 Claims, 7 Drawing Sheets

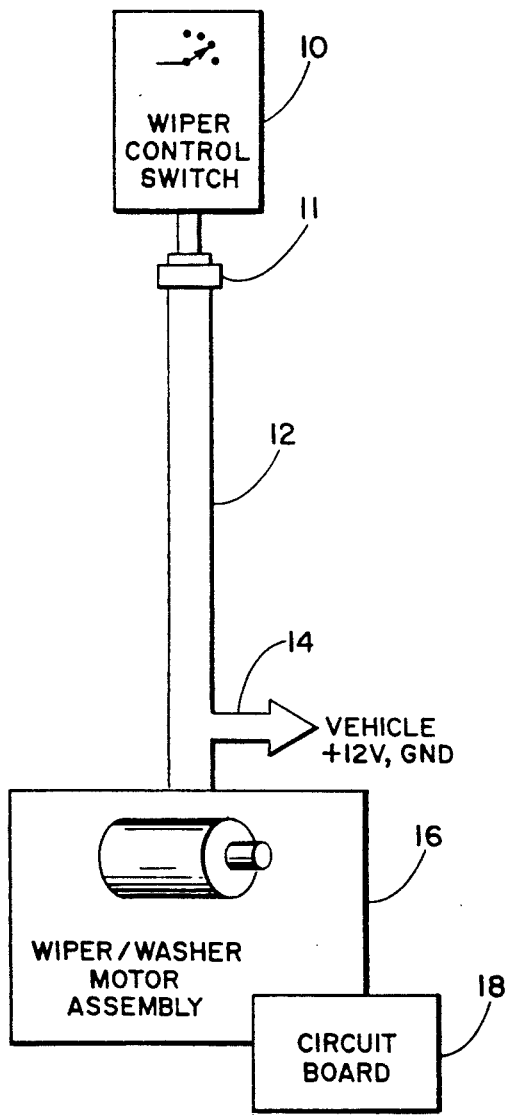
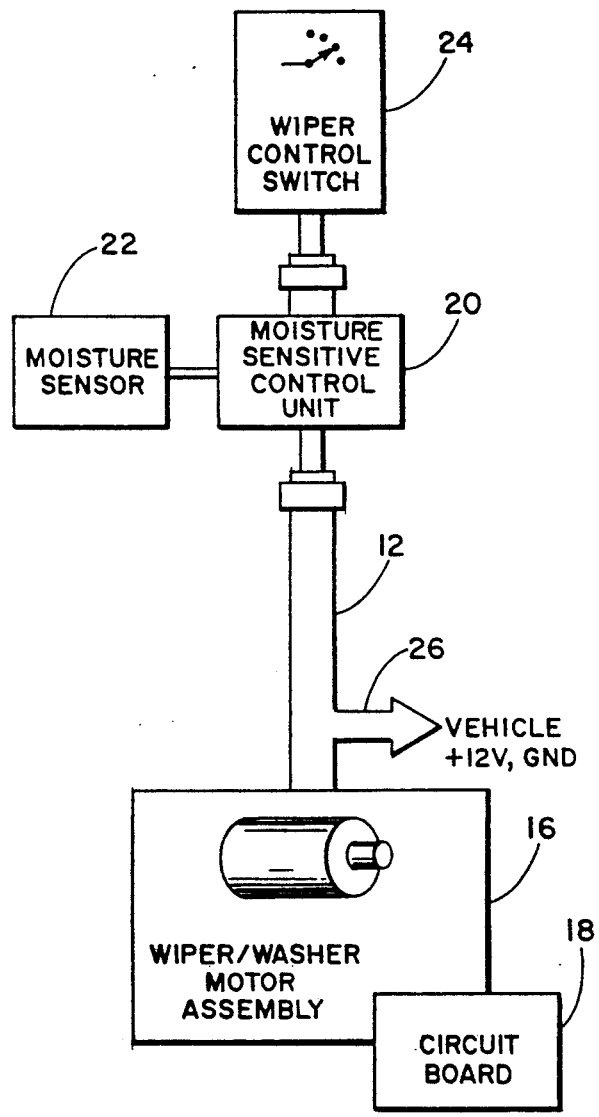
*Fig.-1* (PRIOR ART)
*Fig.-2*

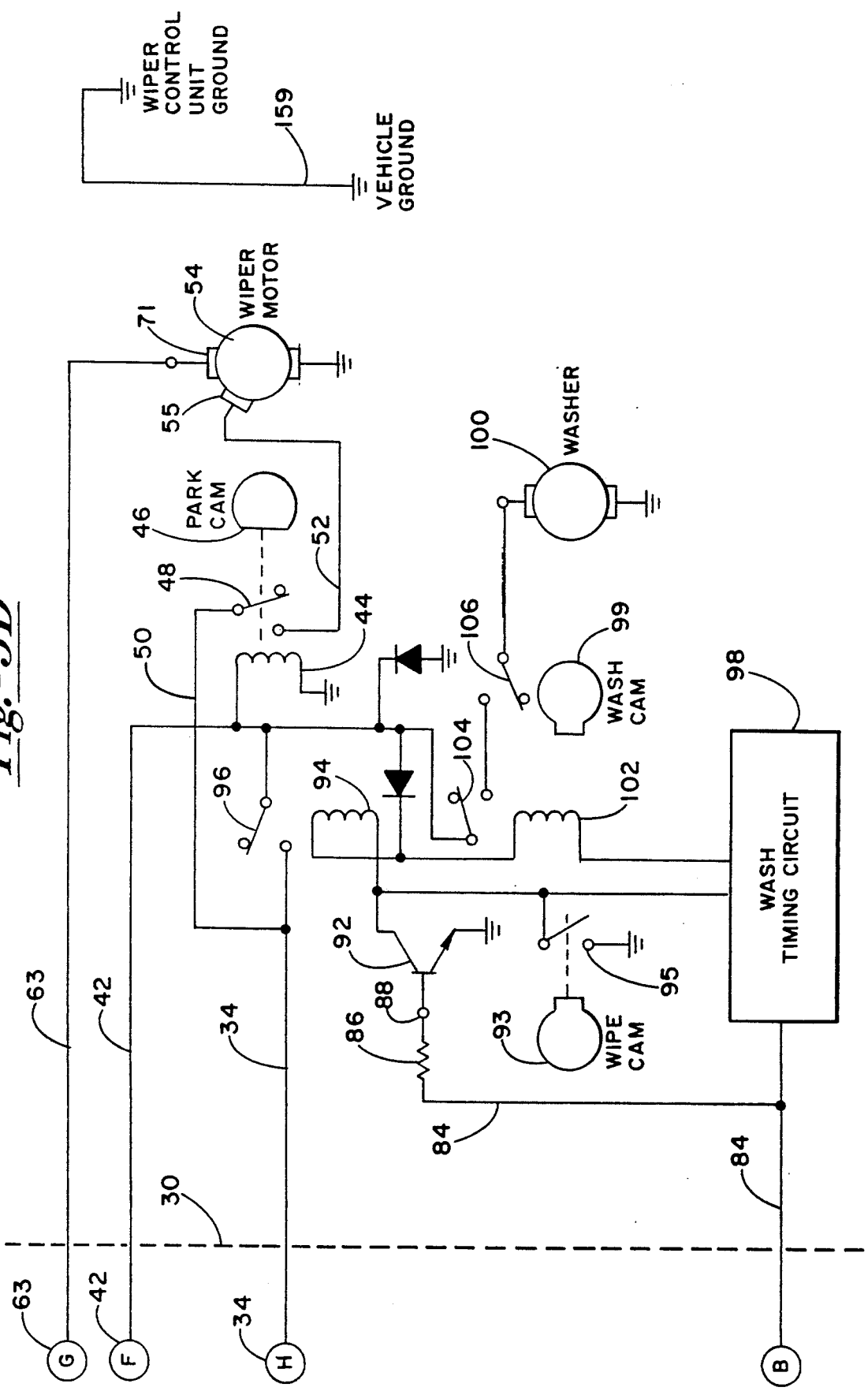

VEHICLE INTERFACE FOR MOISTURE-SENSITIVE WIPER CONTROL

BACKGROUND OF THE INVENTION

I. Field of the Invention

The present invention is directed generally to a control circuit for use with a windshield wiping system on a motor vehicle and, more particularly, to an interface circuit which facilitates the integration of a windshield moisture-sensitive wiper control system into an existing pulse-wipe windshield wiper system control which utilizes the same wiring harness as and has a circuit compatible with the existing system. Circuity configurations and algorithms in the moisture-sensitive system even permit the system to use the existing switch of the pulse-wipe system design.

II. Discussion of the Related Art

A windshield wiper control system that senses moisture and readjusts the operation of the wipers as moisture conditions change is very desirable as it obviates the need for the driver to continually readjust the wiper system manually. Systems have been developed which optically sense the presence of moisture droplets on the windshield and activate the wiper motor and adjust its speed in relation to the intensity of the precipitation encountered. An earlier patent in which the inventor of the present invention is a co-inventor, U.S. Pat. No. 4,620,141, discloses an electronic control circuit for a windshield wiper motor which includes a windshield mounted sensor module utilizing a plurality of radiant energy sources, such as LEDs, which are pulsed on and off in accordance with a pre-established duty cycle, in conjunction with a further plurality of radiant energy sensors, e.g., phototransistors, which are oriented relative to light transmitting channels such that they intersect at the outside surface of the windshield. The plural sensors are connected in a bridge configuration such that when water droplets impinge on the windshield, the light from the sources is refracted to unbalance the bridge. The signal associated with the unbalanced bridge is applied to a window comparator to produce a binary signal which is integrated and applied to a voltage-controlled oscillator that, in turn, is operatively coupled with the windshield wiper relay circuits to drive the wipers at a rate which varies as a function of the level of precipitation being encountered.

A later patent, U.S. Pat. No. 5,059,877, to the inventor in the present application also involves a control circuit for a windshield wiper system which is designed to drive the wiper blades at a rate dependent on the level of precipitation encountered but which also addresses the problem of noise associated with shifts in ambient light level. With earlier rain-responsive wiper systems, sudden or pulsating changes in the level of ambient light striking the sensor module such as, for example, those caused by shadows of utility poles or the like sweeping across the windshield, could cause false triggering and activation of the wipers independent of the presence of rain. The last-cited reference deals effectively with such interfering phenomena by using a set of sample-and-hold circuits, in conjunction with bandpass filtering and a differential amplifier under microprocessor control to linearly reject disturbances in the sensing system due to changes in ambient light, making the system immune to such disturbances.

Large motor vehicle manufacturers typically incorporate a design of wiper system designs that are common among many different vehicle models. This is true of General Motors Corporation, for example, which supplies just two basic wiper systems to cover many of its models. These are a standard wiper system which has the ability to run at either of two fixed speeds and a pulse-wipe system which has the ability to pause for a variable length of time between wipes in addition to operating at either of two fixed speeds. Both systems have mist and wash cycles and employ many common parts including the same system wiring harness.

Such a system is illustrated schematically in FIG. 1 and includes a multi-position wiper control switch 10, which is somewhat different for standard and pulse-wipe systems, but including a connector 11, wiring harness 12 with voltage supply and ground illustrated at 14 which are identical for both systems. The wiper/washer motor assembly illustrated at 16, which includes the blade parking mechanism and other linkages, are common to both systems with the exception that each employs a different control circuit board 18 which are somewhat different but also have common interface connectors with the wiper/washer motor assembly 16. From this it can readily be seen that the only actual differences between the standard and pulse-wipe systems are reduced to variations in the wiper control switch 10 and in circuit board 18, both of which can be replaced quite easily as the interconnects are the same. This degree of commonality or interchangeability makes it relatively simple for the manufacturer to provide both systems in any vehicle made and makes it relatively simple for one to upgrade from the standard to a pulse-wipe system by retrofit at the automobile dealer.

In addition to the two patents previously discussed, a variety of other references involving moisture-sensitive wiper control systems have been devised which also use various means to sense rain and control wiper action. Almost all of these systems, however, pay very little attention to integration and compatibility with existing motor vehicle systems. Such lack of compatibility and the accompanying need to provide a special wiring harness for such a system presents a serious drawback with respect to the practicality of incorporating such a system as a vehicle option by a manufacturer. It clearly would present a great advantage if such a moisture-sensitive wiper control system could be provided with the ability to be easily integrated into the scheme of a preexisting wiper system, such as the pulse-wipe system manufactured by General Motors. Such a system could readily lend itself to addition as an option at the manufacturing stage or as a retrofit on new or on the millions of existing vehicles having compatible windshield wiper control systems.

OBJECTS

Accordingly, it is the principal object of the present invention to provide means to facilitate integrating a moisture-sensitive wiper control system into an existing design of wiper system with minimum impact on manufacture and retrofit Another object of the present invention is to provide a means of easily integrating a moisture-sensitive wiper control system into a class of vehicles using original equipment windshield wiper control systems manufactured by General Motors Corporation.

Still another object of the present invention is to provide a means of easily integrating a moisture-sensitive wiper control system into a class of vehicles in a manner which uses the original equipment vehicle wiring harness and plugs into existing connectors.

Yet another object of the present invention is to provide a means of easily integrating a moisture-sensitive wiper control system into a class of vehicles in a manner which does not interfere with the operation of the standard or pulse-wipe systems already installed.

It is also an object of the present invention to provide a means of easily integrating a moisture-sensitive wiper control system into a class of vehicles in a manner which utilizes the particular electrical configuration of the original equipment switch thereby eliminating the cost associated with developing and tooling a new switch and the associated complexity of retrofitting an existing vehicle to include the moisture-sensitive wiper system.

A further object of the present invention is to provide a means of easily integrating a moisture-sensitive wiper control system into a class of vehicles in a manner which does not interfere with the operation of the original equipment wiper control system in the manual modes even if the computer of the moisture-sensitive system should cease to function for any reason.

Other features and objects of the invention will occur to those skilled in the art in accordance with the drawings and descriptions below.

SUMMARY OF THE INVENTION

The foregoing features and objects of the invention are achieved by providing an automatic moisture-sensitive wiper control system which uses compatible components and the same electrical configuration of wiper control switch as that of the system with which it is designed to be integrated, namely, the General Motors pulse-wipe system. In accordance with the invention, the moisture-sensitive wiper control unit connects to existing connectors. Operation of the system in the manual modes of OFF, LOW, HIGH AND MIST is essentially unaffected by the presence of the moisture-sensitive control unit. The automatic moisture-sensitive mode of operation is designed to replace the intermittent DELAY or pulse operating range in the wiper control switch which can be synonymous with or renamed "AUTO". Of course, it is not necessary to modify the switch in any way for operable installation into an existing vehicle. The system further can be equipped with an adjustable sensitivity based on the existing pulse rheostat or delay circuit or variable resistor.

To operate the system in the automatic moisture-sensitive wiper control mode, the driver simply moves the control switch to the AUTO or DELAY position. In accordance with the control circuit, the wipers will actuate once and from that point on, the wipers will actuate at the high speed, low speed or intermittently as dictated by the moisture conditions. The adjustment range within the AUTO position will control the sensitivity of the system to moisture on the windshield. In the absence of moisture, the wipers are designed to stop at an inter-wipe position, which situates them on the windshield just below the driver's field of view but above the concealed or parked position which is below the hood for many models. This alerts the driver that the wipers are operating in the automatic or moisture-sensitive control mode rather than in the off mode. Turning off the ignition will leave the wiper position unaffected; and turning on the ignition with the wiper switch in the DELAY or AUTO position will initiate a single actuation of the wiper, returning the operation to the moisture-sensitive mode.

BRIEF DESCRIPTION OF THE DRAWINGS

In the drawings, wherein like numerals are utilized to designate like parts throughout the same:

FIG. 1 is a schematic block diagram of an existing windshield wiper/washer control system with which the moisture-sensitive system is designed to be integrated;

FIG. 2 is a schematic block diagram of the control system of FIG. 1 incorporating the moisture-sensitive system in accordance with the invention;

FIGS. 3B, 3C, 3D constitute a single circuit diagram of the present invention;

DETAILED DESCRIPTION

Figure 3A:
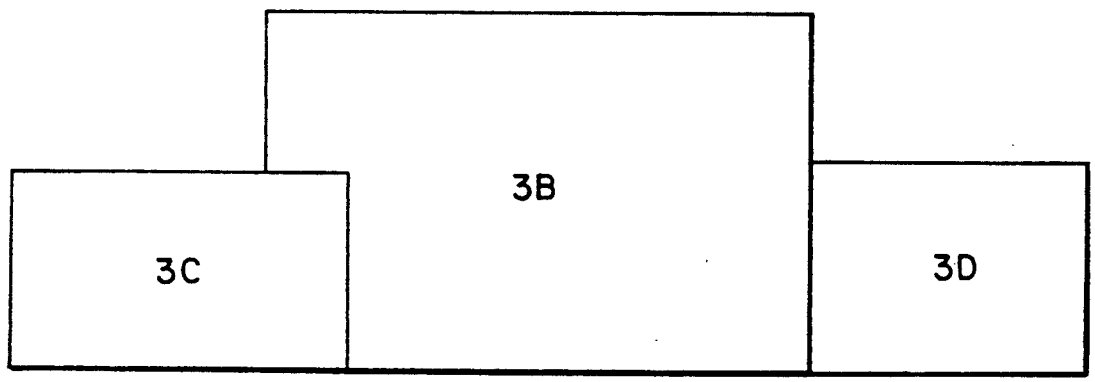
FIG. 3A is a key showing the assembly of the circuit schematic diagram of FIGS. 3B, 3C and 3D.

As mentioned above in accordance with the present invention, the automatic moisture-sensitive wiper control system connects to existing wiring connectors in the previously-designed wiper control system. While the illustrative embodiment is specifically directed to a combination with the pulse-wipe system associated with vehicles manufactured by General Motors Corporation, it will be appreciated that the system is adaptable by those skilled in the art to other similarly situated systems, and the preferred embodiment is presented by way of illustration rather than limitation.

FIG. 2 depicts a schematic block diagram of the moisture-sensitive control unit integrated into the existing pulse-wipe control system. It shows a moisture-sensitive control unit 20 which connects to a windshield-mounted moisture sensor 22 connected to the wiring harness 12 and existing wiper/washer motor assembly 16. The wiper control switch 24 may be the same or involve a slight modification of the wiper control switch 10, and the control circuit board 18 is the same as the circuit board of FIG. 1. The ground system 26 includes an additional connected ground wire not used in the original ground 14.

Figure 3B:
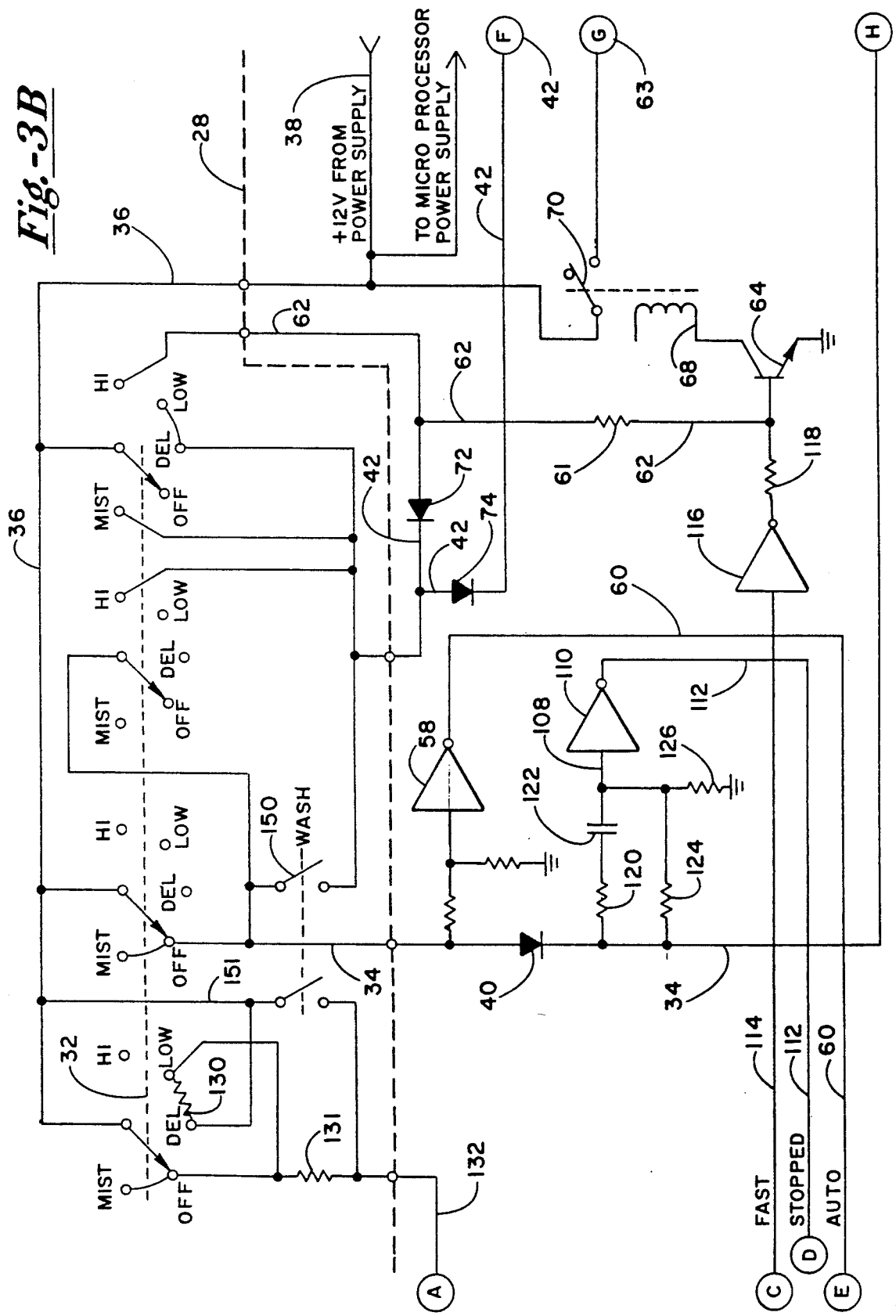
Figure 3C:
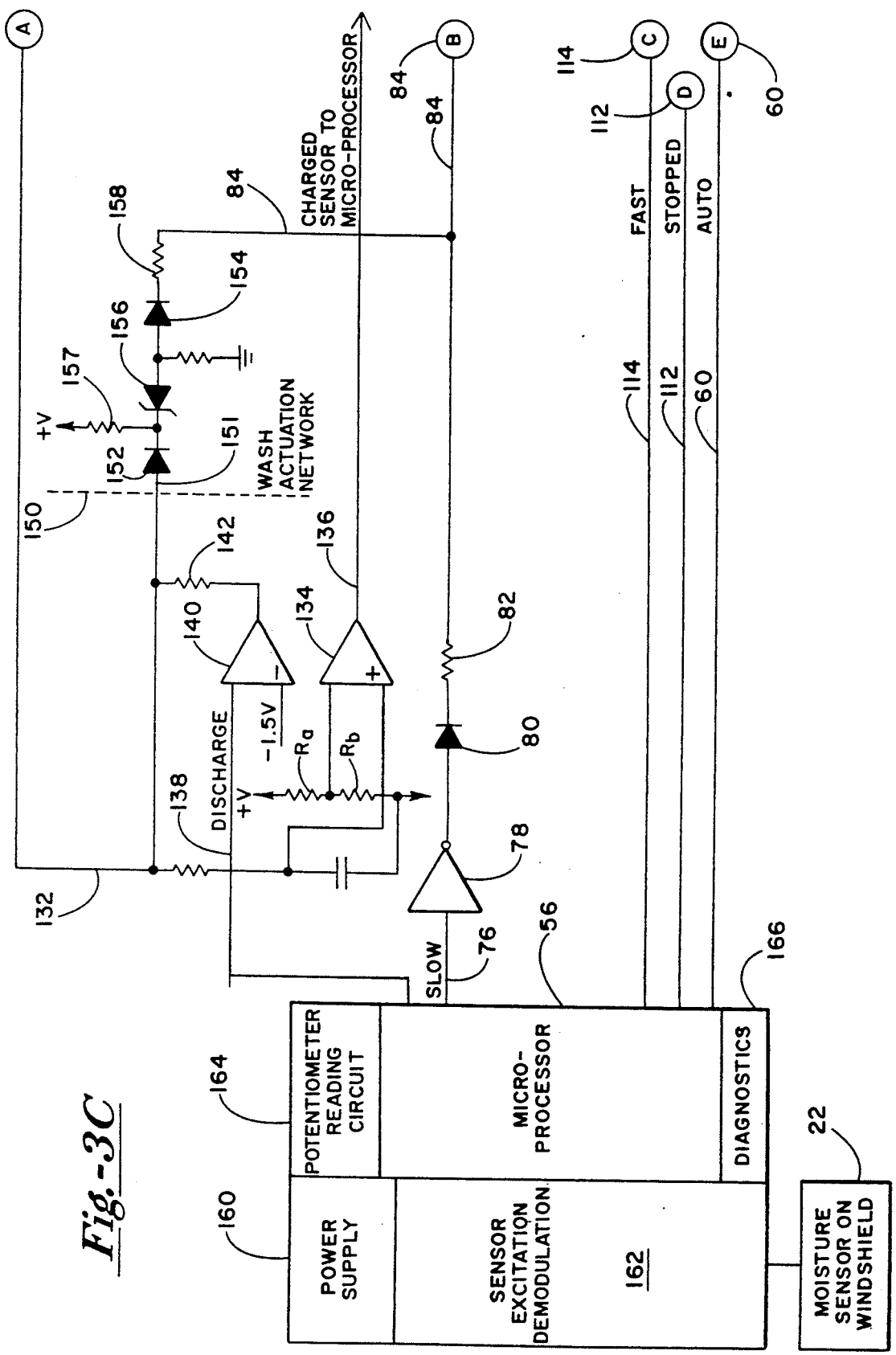

The actual integration of the combined systems is best illustrated in the schematic wiring diagram of FIGS. 3B, 3C and 3D which fit in accordance with schematic 3A. The integrated system is designed to operate in the manual modes of OFF, LOW, HIGH, and MIST and in the DELAY or AUTO moisture-sensitive mode in a manner such that availability of the manual modes is substantially unaffected by the presence of the automatic moisture-sensitive wiper control system. The combined system will be next explained with reference to the Figures by examining each of the different modes of operation for the integrated system. With respect to the schematic wiring diagram of FIGS. 3B, 3C and 3D, FIG. 3D separated by broken line 30 and the part of FIG. 3B above the broken line 28 represent components of the existing vehicle wiring harness and pulse wipe system, and the remainder of FIG. 3B together with FIG. 3C represent the interconnected schematic wiring for the moisture-sensitive wiper control system which can be seen to compatibly connect into the existing harness.

MANUAL (ORIGINAL EQUIPMENT) MODES OF OPERATION

1. OFF.

As can be seen from the Figures, when the wiper selection switch 32 is in the OFF position, it connects the conductor 34 to the power supply or source of 12-volt DC through conductors 36 and 38. This allows current to flow through a blocking diode 40. In the OFF position, of course, the wipers are designed to be in the PARK position, illustrated as 200 on FIG. 5. The system further includes an EXIT PARK relay coil 44 associated with conductor 42. This is a "get out of park" or EXIT PARK relay as it enables the wipers to leave the park position when it is energized. In the OFF mode, although conductor 42 is not connected and thus park release relay 44 is de-energized, if the wiper blades themselves are not in the PARK position, a mechanical cam 46 is provided in the wiper motor assembly which holds the EXIT PARK relay contacts 48 closed thereby connecting conductors 50 and 52 to conductor 34 to energize low speed winding of the wiper motor 54 at 55. This allows the motor 54 to run without the PARK relay engaged and move the wipers into the fully retracted or PARK position. The further rotation of the cam 46 allows the PARK relay contacts to reopen and disconnect the motor.

The operation of the combined system in the OFF mode is essentially equivalent to the operation of the standard and pulse-wiper systems in the OFF mode. In addition, the microprocessor 56 is prevented from intervening or interfering with the function of the system in the OFF mode. In this regard, a level translator 58 is provided which senses the voltage on the conductor 34 setting the output voltage on the AUTO line 60 low (0 volts). Software in the microprocessor responsive to this condition inhibits the processor from attempting to command any action form the motor, regardless of information about moisture conditions detected elsewhere by the sensor.

2. Manual LOW and MIST.

As can be seen from the schematic wiring diagram, with the selector switch in the LOW position, both conductors 34 and 42 are energized, as is the EXIT PARK relay 44 closing PARK relay contacts 48, thereby energizing the low speed winding 55 of the motor 54 via conductors 50 and 52. This operates the windshield wipers across the windshield at low speed.

The operation of the system in the LOW mode, as in the OFF position, is substantially the same as it would have been without the presence of the automatic moisture-sensitive system. As was the case in the OFF position, the presence of the voltage on conductor 34 causes the signal on line 60 to go low and again precludes microprocessor intervention so that failure of the microprocessor in this mode will not affect the operation of the wiper.

The MIST operation is basically equivalent to LOW speed operation as long as the switch 32 is held in the MIST position. A mechanical spring provided in the wiper control (not shown) returns the selector to OFF upon release of the switch. In this manner, the wipers will again park after release of the switch from the momentary MIST position in accordance with the operating sequence in the OFF position.

3. Manual HIGH speed.

When the manual switch is moved to the HIGH position, the power source is connected to conductor 62 via conductor 36. This turns on transistor 64 after encountering resistor 66 thereby energizing relay 68 and closing contact 70, thereby energizing the high speed motor coil at 71 causing it to drive the motor 54 at high speed. Current from conductor 62 further flows on line 42 through diodes 72 and 74 again energizing the EXIT PARK relay 44, which enables the motor to run the wipers at high speed across the windshield. Of course, current from diode 72, through the engaged switch contacts, energizes conductor 34 which, in turn, activates the level translator 58 which, again, causes the AUTO signal to go low precluding any intervention by the microprocessor 56. It will be noted that blocking diodes 40 and 74, respectively located in conductors 34 and 42, are necessary for operation of the system in the moisture-sensitive mode. They prevent the back emf generated by the motor at the conductor 52 from flowing back through the switch and de-energizing the PARK relay which would prevent the wiper blades from leaving the PARK position.

In addition, the preferred embodiment uses the relay 68 to supply current to the motor rather than direct connecting the conductor 62 from the switch to the motor. This is because a direct connection would provide a current path from the high-speed winding to the park relay by way of diodes 72 and 74 and conductor 42 which would produce a situation which any current to the motor would result in the appearance of an emf, the high-speed winding which, in turn, would engage the park relay thereby disabling the ability to park the wipers. The relay also is considerably cheaper than a diode of sufficient power capacity to operate the motor at high speed would be, and the voltage drop associated with a diode would produce an unacceptable slowing of the high-speed operation of the wiper. This condition is not only annoying to the driver but also reduces the rate that the windshield wiper can remove water from the windshield which might compromise the safety of the vehicle. The relay is also used in the automatic moisture-sensitive mode as will be seen below.

AUTOMATIC MOISTURE-SENSITIVE MODE.

1. LOW speed.

The automatic moisture-sensitive mode corresponds to the pulse or delay setting of the pulse-wipe system, and references to AUTO or DELAY refer to the automatic control mode. It involves the detection of the occurrence of rainfall as determined by the moisture sensor on the windshield. The moisture sensor is again represented by block 22 connected to the microprocessor 56. The microprocessor system or circuitry also includes a power supply 160, sensor excitation and demodulation circuitry and logic identified by the block 162, potentiometer reading circuitry 164 and various diagnostic circuit devices in logic indicated by 166. For the purposes of understanding the invention of this application, the details of operation of the moisture sensor need not be set forth. It should be noted that additional details concerning the operation of the moisture sensor and its interface with the microprocessor and additional information concerned with the construction and operation of the automatic moisture-sensitive wiper control system may be obtained from the above-cited U.S. Pat. Nos. 4,620,141 and 5,059,877. To the extent any such details may be necessary to complete the descriptions and accounts necessary for purposes of the present application, they are deemed to be incorporated by reference herein.

As can be seen from the diagram, placement of the wiper control switch in the DELAY or AUTO position applies 12 volts to the conductor 42 from the switch which, of course, energizes the park release relay 44 via diode 74. This momentarily removes the voltage on line 34 from the level translator 58 which now sets the AUTO signal to the microprocessor on line 60 to HIGH (5 volts). This provides information to activate and alert the microprocessor that the wiper control switch is in the moisture-sensing control or AUTO position.

The microprocessor 56 detects that the wiper control has, in fact, been in the AUTO or moisture-sensing position upon receipt of the HIGH signal on input line 60. Thereafter it commands a single actuation of the wiper. This is accomplished by bringing the signal on the conductor 76 (FIG. 3C) which is normally at 5 volts down to 0 volts at the SLOW output of the microprocessor so that the invertor 78 will transform this signal to 5 volts or a high output. This results in a potential through diode 80 and resistor 82 and continuing on line 84 in the moisture-sensitive control unit. Current flows through resistor 86, quickly charging a capacitor 90. Transistor 92 is turned on and, in turn, energizes relay 94 thereby closing contacts 96 and re-energizing the conductor 34 beyond diode 40. The EXIT PARK relay 44 contacts 48 are closed thereby allowing the wiper blade to begin to traverse the windshield. The resistor values are selected such that the timing circuit 98, which could operate the washer motor 100 via relay 102 with contacts 104 and cam switch 106, is not energized in the AUTO MODE.

The appearance of a 12-volt voltage on conductor 34 below diode 40 produces a corresponding voltage on line 108 which causes the output of the level translator 110 on the STOPPED line 112 to go low (to 0 volts). The signal on line 112 informs the algorithms within the microprocessor that the wiper motor is in fact operating. This feedback may also provide useful diagnostic information inasmuch as were the STOPPED line never to go low, the algorithms in the microprocessor preferably set the diagnostics to indicate that a hardware error had occurred.

When the feedback signal on the STOPPED line 112 indicating that the wipe cycle is under way is received by the microprocessor, it removes the wipe command. By this time, however, the wiper is well up on the windshield and a cam (not shown) in the timing circuit 98 continues to hold the engaged relay 94 keeping the relay contacts 96 closed until the wiper reaches the end of the wipe cycle. At this point, the cam of the timing circuit releases the contacts of relay 94, and the potential on the conductor 34 to the motor assembly drops to zero. This, in turn, causes the motor to stop and the level translator 110 to bring the signal on the STOPPED line 112 to high (5 volts). The microprocessor then uses this information to precisely set the dwell time between wipes, thereby allowing the wiper blades to remain in the inter-wipe position as illustrated at 202 in FIG. 5.

In this manner, in the presence of a light mist, the microprocessor will repeat the above-described single actuation at intervals several seconds apart depending on the intensity of the precipitation. Should the amount of rainfall justify actuation of the wipers at a steady slow speed without pauses between wipes, the microprocessor will simply continue to hold the SLOW line 76 low. In this manner, at the end of each wipe cycle, the capacitor 90 will discharge and recharge rapidly and the cycle will repeat. This causes a delay of but a few milliseconds between wipes which is not perceptible to observers so that the wipers appear to run at a continuous rate of speed. While not objectionable, this pause may be eliminated by incorporating an additional resistor in the motor assembly in series with capacitor 90 on conductor 88. For one motor, a value of 270 ohms produced smooth operation without pause between travels of the wiper across the windshield.

2. Operation at HIGH speed.

The detection of heavy rainfall by the windshield sensor will cause the unit to operate the wipers at HIGH speed. This is based on algorithms within the microprocessor which dictate that this is necessary when the input from the windshield sensor is above a certain pre-set threshold value. When this occurs, the microprocessor 56 sets the potential on FAST line 114 to a low state (0 volts). This signal is inverted by level translator 116 and the signal, after passing through resistor 118, turns on transistor 64 to energize relay 68 and close contacts 70 causing the full 12-volt potential to be applied to the high speed motor winding 71 via conductor 63. Of course, as noted previously, in the AUTO or moisture-sensing mode, the conductor 42 is energized by way of diode 74 thereby energizing the relay 44 and engaging the contacts 48 releasing the wipers from the PARK position.

It should be noted that the blocking diodes 40 and 74 make it possible for the motor to run at HIGH speed with the switch in the AUTO or moisture-sensitive position. They are necessary because when the motor is powered by way of the HIGH speed winding, it develops a rather large back electromotive force of up to 20 volts on the LOW speed winding, which is present on conductor 52. During portions of the wiping cycle, a cam (not shown) in the timing circuit 98 closes the contacts 96 of the relay 94 thereby applying this large amount of back emf to the conductor 42. In the absence of either diode 40 or diode 74, the back emf would be connected directly to the 12-volt input by way of conductor 42 and switch thereby effectively shorting the HIGH and LOW speed windings of the motor. Such a condition is not good for the motor as it causes the motor to slow down and draw excessive current which, in turn, causes the motor brushes to wear out prematurely. The blocking diodes obviate this condition.

The blocking diode 40 is also necessary in order for the microprocessor to receive accurate information pertaining to the fact that the switch is in the AUTO position. Without the diode 40, all of the conductor 34 would be at a high potential any time the motor was running. There would be no way of knowing that the user had, for example, selected manual LOW speed when the microprocessor was selecting HIGH speed. The addition of diode 40 allows the processor to have a single input AUTO that reliably informs the microprocessor connected algorithms that the user has selected the moisture-sensitive mode of operation.

3. Exiting from the Steady SLOW.

Figure 5:
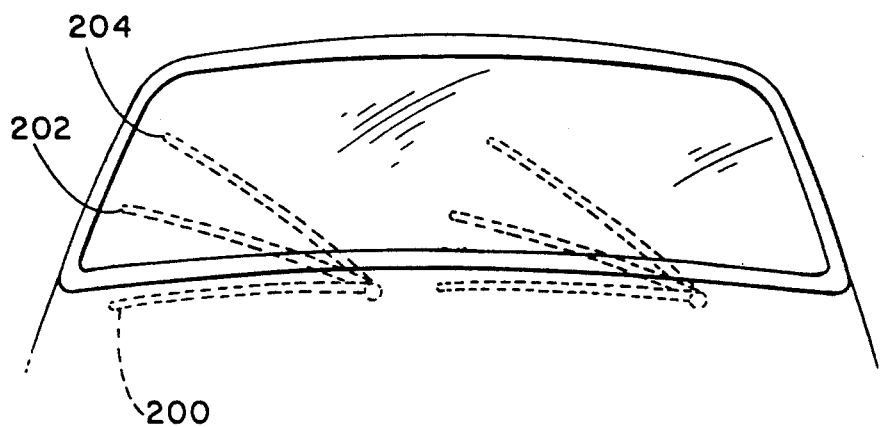
FIG. 5 represents a schematic illustration of several wiper positions.

A careful analysis of the operation of the system described reveals that it is possible to remove the command to the slow line 76 at a time that would cause the wipers to stop partway up on the windshield out of the inter-wipe position as shown in FIG. 5 at 204, which is designated as the "error" position. This can occur because it is possible to remove the command on the conductor 76 after the wiper has left the inter-wipe position 202 but before the wipe cam 93 (FIG. 3D) has caused the contacts 95 to remain engaged. While this might not happen often, occasionally the wipers would stop partway up the windshield in the error position. Of course, a subsequent actuation of the wiper will move the wiper off that error position, but even a momentary pause of the wiper within the driver's field of view would be both distracting and annoying.

Accordingly, the system has been designed so that the slow command is removed only while the wipe cam 93 is in control. This is done by immediately sensing a slowing down of the wipers upon removal of the slow command on conductor 76. This rapid detection of motor slowing is aided by a differentiator circuit including serial resistor 120 and capacitor 122 in parallel with resistors 124 and resistor to ground 126.

Figure 6:
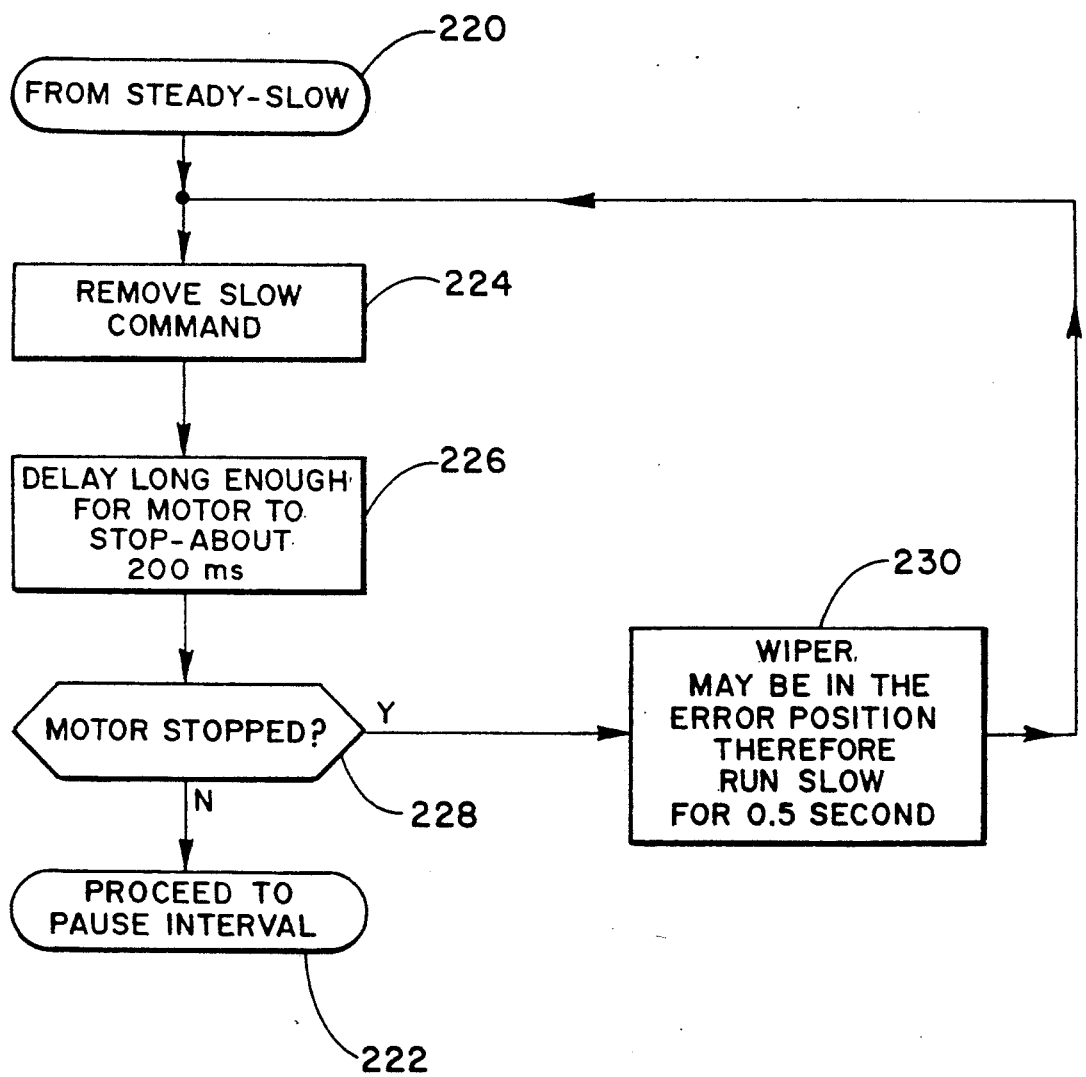
FIG. 6 is a logic block diagram showing a wipe error algorithm in accordance with the invention.

An algorithm which can be used with this system to prevent the wiper-error condition is illustrated in the schematic logic diagram of FIG. 6 which operates to change the mode of operation from steady slow at 220 to intermittent wiping at 222 via the logic loop including blocks 224, 226, 228 and 230. Note that if the motor has not stopped at 228 after the 200 millisecond circuit delay at 226, the possibility of the wiper being stuck in the error position has passed and it can safely proceed to the desired pause interval at 222. If, in fact, the motor has stopped at 228, it will be restarted at 230 for 0.5 second which is plenty of time to return it to the inter-wipe position for the pause cycle at 222.

It will further be appreciated that the potentiometer 130 (FIG. 3B) associated with the delay setting on the pulse-wipe control switch which corresponds to the DELAY auto mode for the moisture-sensitive control may conveniently be used as a sensitivity adjustment setting for the moisture-sensing mode control. In this regard, it is desirable that a sensitivity potentiometer reader be provided that is able to produce a value in software that corresponds linearly to the mechanical position of the sensitivity adjustment control. Ideally, this reading of the potentiometer position should be unaffected by supply voltage or ambient temperature, and should provide good resolution of small differences in potentiometer settings.

In this regard, a ratiometric sensitivity reader circuit is provided which generates a value corresponding to the sensitivity potentiometer setting in conjunction with resistor 131 on lines 132 and 133 that is inherently linear. The system includes a timing capacitor $c_t$, a pair of resistors $R_a$ and $R_b$ and a comparator 134 on the charging circuit which gives an output on line 136. A discharge circuit is provided that includes a maximum discharge signal input 138, comparator 140 and resistor 142 connected to common line 132 which is, of course, in series with the potentiometer 130.

First assuming that the timing capacitor, $c_t$, is discharged, the operation of the circuit will next be described. The current flowing through the sensitivity control potentiometer 120 will charge capacitor $c_t$ through line 132 in a manner such that the capacitor will be charged to Vcap at a rate which exponentially approaches V+ or :

$$Vcap = V+(1exp(-t/Rpot*C_t))$$

where Rpot equals the potentiometer setting and t is time in seconds. At this point, comparator 134 signals the microprocessor on line 136 that the timing capacitor has reached a threshold voltage, Vth, which is:

$$Vth = K\ V+, \text{ where } K = Rb/(Ra+Rb).$$

Thus, in the time it takes for the voltage across the timing capacitor, $C_t$, to reach the threshold is given by solving V=Vth for time, or :

$$t = Rpot * Ct(-Ln(1-K))$$

Since $C_t - Ln\ (1-k)$ is a constant, the time for the timing capacitor to charge to the threshold is linearly proportioned to the sensitivity potentiometer setting. It is independent of supply voltage and temperature. The microprocessor can measure this time to obtain a value for the sensitivity potentiometer.

Conversely, after the microprocessor measures the time for Vcap to reach Vth, the microprocessor sets the DISCHARGE signal on conductor 138 high which, in turn, causes the open collector of comparator 140 to discharge $c_t$. The microprocessor delays a sufficient time for this to happen and then restarts the charging cycle. In this manner, the system of sensitivity potentiometer, sensitivity reader circuit and microprocessor, in effect, forms an oscillator that continuously reads the setting of the sensitivity control and applies it to control the moisture-sensitive wiper control system.

The conductor 132 from the switch, in addition to controlling the sensitivity of the system, is connected directly to the input voltage on line 36 via conductor 151 when the user presses the WASH button 150. This activates the wash activation network including diodes 152 and 154, zener diode 156 so that current flows through 152, 156, 154 and resistor 158 through the wiper motor assembly through washer timing circuit 98 which, with cam 99, performs a windshield washing function as the timing circuit times out. This manual function, like other manual functions associated with the pulse-wipe system, again is performed without any intervention by the microprocessor. In this regard, the microprocessor detects the wash condition by noting that the DISCHARGE line 138 can no longer cause the charge line 136 to go low. It should be noted that zener diode 156 together with diode 152, resistors 157 and 158, allow the sensitivity reader to remain unaffected by the circuit below a fairly high Vcap (i.e., about 5.4 volts). An alternative circuit shown in FIG. 4B uses a 4.7 V zener diode 170 and resistor 172. The values of the circuit elements are selected so that this condition does not occur unless the user, in fact, presses the WASH button 150. In addition, it can be seen that the SLOW command generator also is not affected.

The embodiment that has been described operates in a manner such that the wipers are parked in the INTER-WIPE position rather than the PARK position anytime that the control knob is in the DELAY or AUTO position. This avoids potential safety hazards associated with the possibility that the concealed wiper blades would traverse the windshield suddenly upon the detection of moisture rather than only in response to some conscious manual manipulation of the switch.

In an alternative embodiment to the one previously described, the system can be implemented by providing a separate arming button. The arming button would function only when the switch is in the off mode and would initiate the single swipe repositioning sequence in which the wiper control unit would actuate the wipers once leaving the wipers in the INTER-WIPE position during subsequent operation of the system in the AUTO mode. In this manner, operating the arming button would have the same effect as putting the system into the AUTO mode without that button. An additional timing circuit or program in the microprocessor could be used to produce a signal to shut the system off and return the wipers to the fully parked position after the passage of a predetermined amount of time, say 15 minutes, in which no rain is detected. In this manner, the moisture-sensitive mode associated with the arming button would preserve the function of the delay or sensitivity adjustment involving the potentiometer and existing software. Of course, an indicator could be used to display the ARMED status of the system.

Figure 4A:
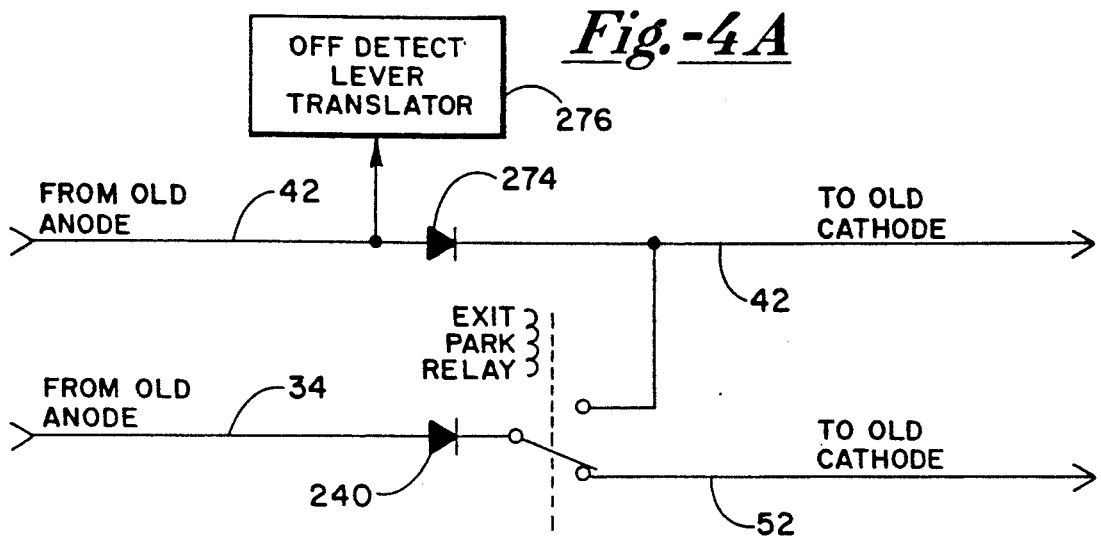
FIG. 4A shows an alternate circuit form moving the wiper from the "park" position.
Figure 4B:
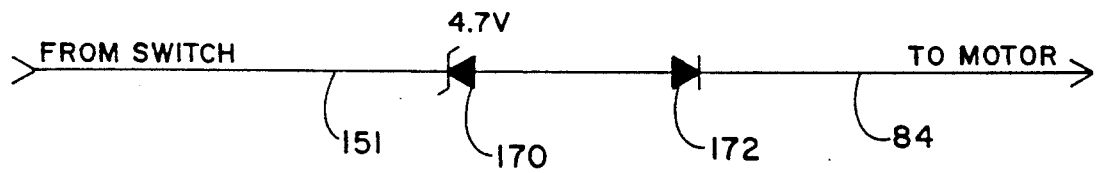
FIG. 4B is an alternate wash circuit.

The above modifications would require some modification of the interface wiring to accommodate provisions for exiting the park position while wiper control switch is still in the OFF mode upon actuating the ARMING mode. Such modification is illustrated in FIG. 4A in which the diodes 40 and 74 are moved in the system close to the park relay as diodes 240 and 274 and, wherein an additional OFF DETECT level translator 276 is added.

In operation, it will be recalled that the microprocessor leaves the EXIT PARK relay de-energized for operation in all manual modes. The DELAY or AUTO mode of the wiper switch is detected by the level translator 58, and the OFF DETECT level translator 276 looks for low input to signify that the wiper switch is still in the OFF position. When the operator then engages the moisture-sensing mode by pressing the AUTO button, the microprocessor pulls in the EXIT PARK relay. From this point, operation is similar to that previously described in the preferred embodiment of the interface. After about 15 minutes without sensed moisture, the microprocessor will disengage the EXIT PARK relay and the wipers will park, shutting down the system. Thus, it can be seen that the entire system involved with the automatic moisture-sensitive windshield wiper control in accordance with the invention can be integrated with the existing pulse-wipe windshield wiper control by simple connections integrating it with the existing wire harness of the pulse-wipe control without the need to change any electrical elements in that system. The systems are entirely compatible and the retrofit requires the making of only a few electrical and mechanical connections. This includes the use of ground wire 159 as a common ground connection.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

I claim:

1. In an integrated manual/automatic windshield wiper control system including an automatic moisture-sensing wiper control system and an original equipment automatic/manual wiper control system equipped with a manually controlled PULSE-WIPE mode setting, wherein the moisture-sensing wiper control system replaces the PULSE-WIPE mode setting and includes a system for adjusting the moisture sensitivity of the moisture-sensing control system which comprises a manually mechanically positioned variable resistor device associated with the PULSE-WIPE mode setting of the manual control, the improvement comprising:

microprocessor controller means for receiving input signals and generating output control signals;

a sensitivity reader circuit which, with the microprocessor controller means, continually monitors the position of the variable resistor device and uses it in the control of the moisture-sensing wiper control system; and wherein the variable resistor device for adjusting the moisture sensitivity of the moisture-sensing system further includes linearizing means associated with the sensitivity reader circuit that produces a value in software that corresponds linearly to the mechanical position of the variable resistor device.

2. The apparatus of claim 1 wherein the linearizing means associated with the sensitivity reader circuit comprises a charging circuit and further comprising:

a timing capacitor;

a pair of parallel connected resistors connected in parallel with the capacitor and a comparator connected to produce an output which becomes an input signal to the microprocessor controller means indicative of the state of charge of the capacitor;

a discharge circuit including circuit means for discharging the timing capacitor in accordance with a discharge output control signal from the microprocessor controller means which occurs at the time the timing capacitor reaches a threshold voltage determined by the position of the variable resistor device thereby producing a charge, discharge operation that cycles at a duty cycle proportional to the setting of the variable resistor device.

3. A method for producing an integrated manual/automatic windshield wiper control system by combining an original equipment wiper control system having a multi-function manual/automatic wiper control with an automatic moisture-sensing wiper control system which operates based on the sensing of windshield moisture, comprising the steps of:

providing an original equipment wiring harness, including a source of direct current and an available ground to supply power to the original equipment wiper control system, wherein the function of the original equipment wiper control system includes at least one manual wiping position and an OFF position and wherein the original equipment wiring harness is provided with an available optional connection for a time variable pulse-wipe system;

providing an automatic moisture-sensing wiper control, the automatic moisture-sensing wiper control being capable of retrofit with the original equipment wiper control system;

connecting the moisture-sensing wiper control in place of the pulse-wipe system in the original equipment wiring harness; and providing interface circuit means compatibly connectable in the circuitry of the original equipment wring harness to prevent the operation of the automatic moisture-sensing wiper control from interfering with the manual operation of the wiper system in the manual positions of the original equipment wiper control system.

4. The method of claim 3 wherein the original equipment wiper control system includes a multi-position switch means to operate the system, the method comprising the further step of replacing the multi-position switch means controlling the original equipment wiper control system with one switch means including a moisture-sensing position.

5. An integrated manual/automatic windshield wiper control system comprising:

an original equipment wiper control system; and an automatic moisture-sensing wiper control, the automatic moisture-sensing wiper control being capable of retrofit with the original equipment wiper control system;

wherein the original equipment wiper control system comprises:

a wiper set including one or more windshield wipers having wiper blades, a multi-position switch means having an OFF position and at least one manually settable ON position, a wiper drive motor mechanically connected to drive the wiper set, wherein the multi-position switch means controls the running speed of the wiper drive motor when the multi-position switch means is set at the at least one manually settable ON position, a blade parking mechanism which causes all wiper blades to park in a park position when the multi-position switch means is in the OFF position, and releases all wiper blades from the park position when the multi-position switch means is in the at least one manually settable ON position, a wiring harness having a plurality of conductors for electrically interconnecting the wiper drive motor, the multi-position switch means and a source of direct current, the wiring harness further including pulse-wipe conductors designed to be connected to optionally allow operation of the wiper drive motor in an intermittent PULSE-WIPE mode, and circuit components associated with the original equipment wiper control system;

the improvement, wherein the automatic moisture-sensing wiper control is electrically connected directly into the wiring harness between the multi-position switch means and the wiper drive motor of the original equipment wiper control system, the connection replacing the optional intermittent PULSE-WIPE mode of the original equipment wiper control system, the automatic moisture-sensing wiper control further being configured such that the original equipment wiper control system requires no change in the wiring harness and the existing circuit components to compatibly receive the automatic moisture-sensing wiper control.

6. The apparatus of claim 5 wherein the automatic moisture-sensing wiper control includes interface circuit component means such that it does not interfere with the normal operation of the original equipment wiper control system in all modes other than the intermittent PULSE-WIPE mode.

7. The apparatus of claim 6 wherein the automatic moisture-sensing wiper control includes a microprocessor controller and wherein the interface circuit component means includes means to prevent the microprocessor controller from interfering with the operation of the original equipment wiper control system in all modes other than the intermittent PULSE-WIPE mode.

8. The apparatus of claim 7 wherein the interface circuit component means further includes level translator means to control microprocessor control input signals during manual operation of the original equipment wiper control system and blocking diode means to control input voltage to the level translator means and back emf from the wiper drive motor.

9. The apparatus of claim 8 wherein the interface circuit component means further includes a relay capable of engaging the wiper drive motor in a high speed operation, operatively connected to the multi-position switch means to allow manual override of the automatic moisture-sensing wiper control.

10. An integrated manual/automatic windshield wiper control system comprising:

an original equipment wiper control system; and an automatic moisture-sensing wiper control, the automatic moisture-sensing wiper control being capable of retrofit with the original equipment wiper control system;

wherein the original equipment wiper control system comprises:

a wiper set including one or more windshield wipers having wiper blades, a multi-position switch means having an OFF position, a plurality of manually settable ON positions, a MIST position and optional PULSE-WIPE automatic position, a wiper drive motor mechanically connected to drive the wiper set, wherein the multi-position switch means controls the running speed of the wiper drive motor when the multi-position switch means is set at a manually settable ON position, a blade parking mechanism which causes all wiper blades to park in a park position when the multi-position switch means is in the OFF position, and releases all wiper blades from the park position when the multi-position switch means is in a manually settable ON position, a wiring harness having a plurality of conductors for electrically interconnecting the wiper drive motor, the multi-position switch means and a source of direct current, the wiring harness further including pulse-wipe conductors designed to be connected to optionally allow operation of the wiper drive motor in an intermittent PULSE-WIPE mode, and circuit components associated with the original equipment wiper control system;

wherein the automatic moisture-sensing wiper control allows operation in a MOISTURE-SENSING mode electrically connected directly into the wiring harness between the multi-position switch means and the wiper drive motor of the original equipment wiper control system, the connection replacing the optional intermittent PULSE-WIPE mode of the original equipment wiper control system;

wherein the automatic moisture-sensing wiper control further is configured such that the original equipment wiper control system requires no change in the wiring harness and the existing circuit components to compatibly receive the automatic moisture-sensing wiper control;

wherein the automatic moisture-sensing wiper control further includes a microprocessor controller that produces control input signals to control operation of the moisture-sensitive wiper controls; and wherein the automatic moisture-sensing wiper control includes interface circuit component means such that the moisture-sensing wiper control including the microprocessor means does not interfere with the normal operation of the original equipment wiper control system in all modes other than the intermittent PULSE-WIPE mode.

11. The apparatus of claim 10 wherein the interface circuit component means further includes level translator means to control microprocessor controller control input signals during manual operation of the original equipment wiper control system and blocking diode means to control input voltage to the level translator means and back emf from the wiper drive motor.

12. The apparatus of claim 11 further comprising means to prevent stalling of the wipers on the windshield in an error position when operating in the MOISTURE-SENSING mode.

13. The apparatus of claim 12 wherein the means to prevent stalling of the wipers in an error position comprises a wiper motor control algorithm.

14. The apparatus of claim 12 wherein the means to prevent stalling of the wipers in an error position comprises a contact-closing cam and a differentiating circuit which detects the stopping of the motor.

15. The apparatus of claim 12 further including means for moving the blades from a concealed to a visible position when the moisture-sensing mode is activated.

16. The apparatus of claim 15 further comprising a separate arming control to reposition the wipers and to indicate that the moisture-sensing wiper control has been activated.

17. The apparatus of claim 11 further comprising means for adjusting the sensitivity of the moisture-sensing wiper control.

18. The apparatus of claim 17 wherein the means for adjusting the sensitivity of the automatic moisture-sensing wiper control comprises a manually adjustable variable resistor means associated with the PULSE-WIPE mode of the original equipment wiper control system and a sensitivity reader circuit which with the microprocessor controller continually monitor the setting of the variable resistor means and apply it to modulate the control input signals to control the moisture-sensitive wiper control.

19. The apparatus of claim 18 wherein the means for adjusting the sensitivity of the automatic moisture-sensing wiper control includes linearizing means associated with the sensitivity reader circuit that produces a value in software that corresponds linearly to the mechanical position of the manually adjustable variable resistor means.

* * * * *